Feb. 3, 1970  E. VAN BAERLE  3,492,932
MACHINE FOR PROCESSING PHOTOGRAPH FILMS AND PRINTS
Filed Aug. 25, 1967  6 Sheets-Sheet 6

INVENTOR.
EDWARD VAN BAERLE,
BY
Wolfe, Hubbard, Voit & Osann
ATTORNEYS.

United States Patent Office 3,492,932
Patented Feb. 3, 1970

3,492,932
MACHINE FOR PROCESSING PHOTOGRAPH FILMS AND PRINTS
Edward Van Baerle, Wilmette, Ill.
(410 N. Michigan Ave., Chicago, Ill. 60611)
Filed Aug. 25, 1967, Ser. No. 663,263
Int. Cl. G03d 3/00
U.S. Cl. 95—89                16 Claims

ABSTRACT OF THE DISCLOSURE

A machine for processing color films and prints employing a loop of chain transporting a plurality of print-supporting arms cammed upwardly and downwardly for treatment of each print in successive vats and with the speed of the chain serving as a time base. The chain mounts a series of supports hinged for vertical swinging movement and which support carrier arms. Print holders are suspended at the ends of the carrier arms. Extending parallel to the chain is a cam bar for camming the arms upwardly and downwardly so that the print holders are submerged in successive vats for predetermined different time intervals, depending upon the contour of the cam bar. The prints are loaded at one end of the series of vats and unloaded when traversal is completed. Means are provided for holding the print holders at different drain angles upon removal from the successive vats. Means are further provided for rapidly changing the contour of the cam bar and for automatic replenishment of the solutions in the vats under the control of the carrier arms.

---

The present invention relates to photographic processing and more particularly to an automatic machine for processing color films and prints.

In the custom processing of color films and prints, the exposed materials which arrive at the laboratory from time to time during the course of the working day are usually accumulated until a minimum number are at hand to warrant processing as a batch. This frequently results in delay in the servicing of small or irregular orders. Delay is also experienced in servicing large orders where facilities are limited.

It is, accordingly, an object of the present invention to provide a continuous processing machine for color films and prints which may be operated more or less constantly during the working day and which is at all times in readiness to begin the processing of small orders as they come in. It is a more general object to provide a machine having a high production rate but which may be economically operated even at a small fraction of its total capacity. It is a related object to provide a processing machine which is completely automatic, even to the extent of replenishing the processing fluid, and which requires an operator only in the loading and unloading steps. Since skill or judgement is not required, the labor cost is low but the quality of the product is high and uniform.

It is still another object of the present invention to provide a machine for processing color prints which, in spite of its automaticity, is capable of handling material which has been either under or over exposed and which requires compensation, particularly in the developing step.

It is another object to provide an automatic processing machine which is distinguished by a number of interesting structural and procedural features including a novel light locking arrangement, drain control, and improved means for loading and unloading. It is, in short, an object of the present invention to provide a machine which has the above desirable attributes but which is at the same time inherently inexpensive, which may be flexibly adapted to various specific color processes, and which reduces the cost of processing on either a custom or production basis.

Other objects and advantages of the invention will become apparent upon reading the attached detailed description and upon reference to the drawings in which:

FIG. 2a is a diagram showing the passage of a print holder from the darkroom to the lightroom;

While the invention has been described in connection with a preferred embodiment, it will be understood that I do not intend to be limited to the particular embodiment shown but intend to cover the various alternative and equivalent constructions included within the spirit and scope of the appended claims.

Figures 1A, 1B:
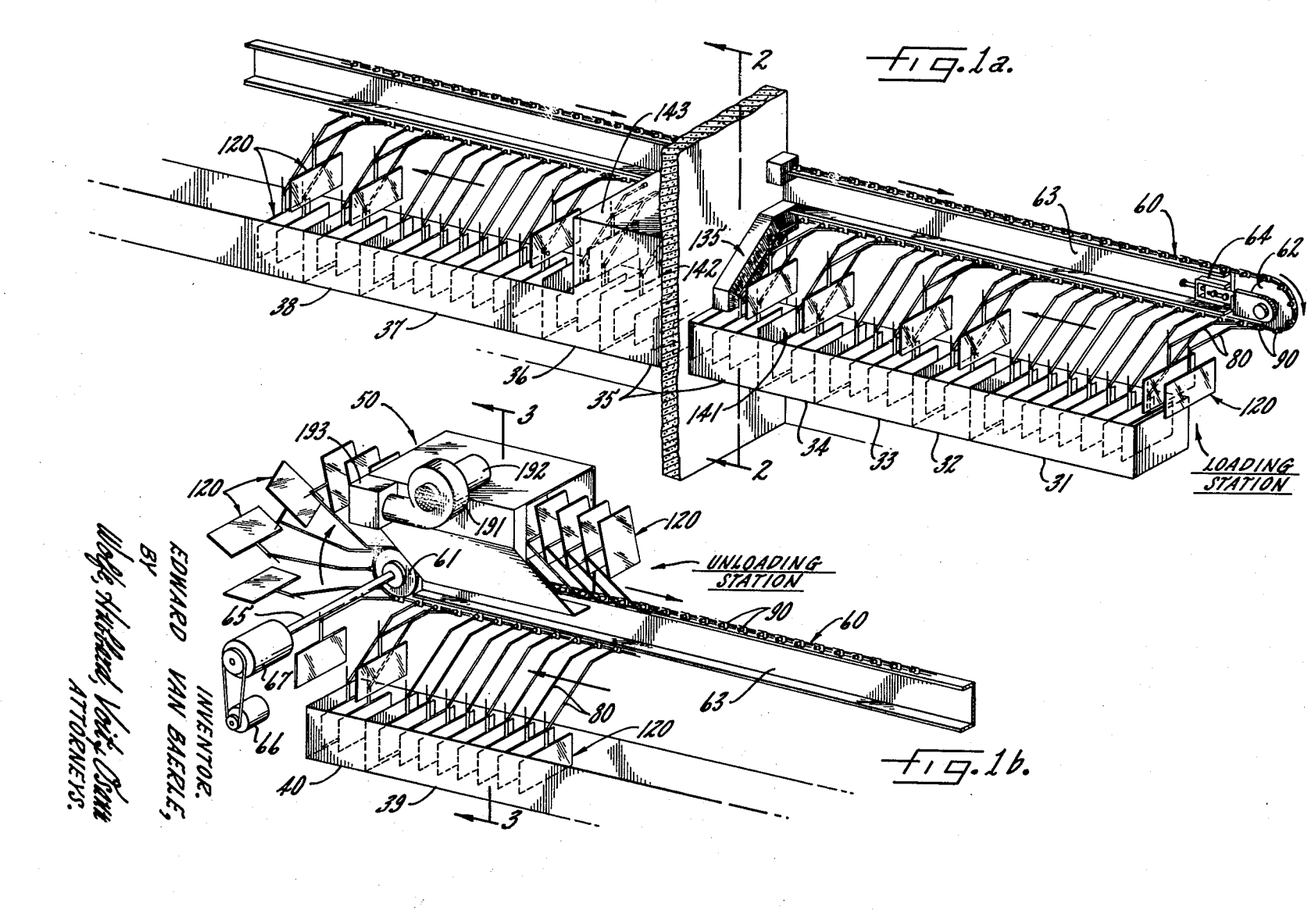
FIGURES 1a and 1b are diagrammatic perspectives of the beginning and end portions of a processing machine constructed in accordance with the present invention.

Turning now to the drawings there is shown, a somewhat diagrammatically and at reduced scale, in FIGS. 1a and 1b the initial and final portions, respectively of a film and print processing machine constructed in accordance with the invention. As it is well known, the processing steps are conventionally carried out by immersing the exposed medium in a succession of chemical baths and washes in accordance with a predetermined time cycle. Such baths or washes may be in a series of trays, tanks or vats, and the films or prints may be conveyed from one to the next manually if desired. In the present processing machine the first vat indicated at 31 contains the developer solution. Following this the print is transferred to a rinsing vat 32, into a hardener solution in vat 33 following which the print is washed in a vat 34. A vat 35 is utilized as part of the light baffling arrangement, as will be discussed, and this vat may contain wash water. The print is conveyed to another wash vat 36 from which it is transferred into a color developer vat 37 and wash vat 38. It is not the purpose of the present application to cover the specific chemical or procedural steps employed in processing, and it will suffice to say that the prints are transferred to additional vats, in succession, as appropriate, being finally washed in running water in a vat 39 and stabilized by dipping into a vat 40 containing a stabilizing solution. The prints then pass to a dryer generally indicated at 50.

In accordance with the present invention an endless loop of drive chain is provided which extends longitudinally, adjacent and parallel to the row of vats, and having provision for mounting a closely spaced series of carrier arms having print holders at the ends thereof and hinged to the drive chain and means for camming the carrier arms so that the holders are successively submerged in the vats for predetermined time intervals as the chain moves at constant speed. Further in accordance with the invention the drive chain penetrates a wall which defines a darkroom and a lightroom with respective loading and unloading stations and with novel baffling means to prevent passage of light through the wall. Thus referring to the drawings I provide a chain 60 having a drive sprocket 61 and an idler sprocket 62 journaled at the ends of a longitudinally extending beam 63, a tensioning or take-up connection 64 being interposed between the beam and the idler sprocket and the drive sprocket 61 being connected to a drive shaft 65. For driving the chain at an accurately predetermined speed, a constant speed motor 66, which is preferably of the A-C synchronous type, is coupled to a speed reducer 67, which is directly connected to the drive shaft.

Figure 3:
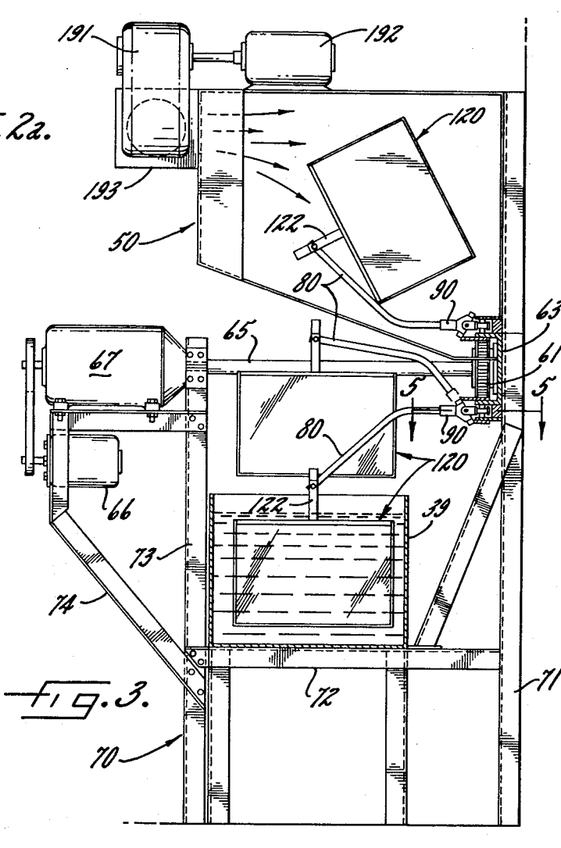
FIG. 3 is an end elevation taken along the line 3—3 of FIG. 1b showing the motor drive, heater, and dryer tunnel.

For supporting the chain, the chain driving means and the vats, a frame 70 is provided as shown in FIG. 3. The frame includes a plurality of upright members 71 and cross members 72 which may be made of channel or angle section and which are spaced at intervals along the length of the machine, the chain beam 63 being secured to upright members 71. Further upright members 73 having bracket structure 74 serve to support the drive motor 66 with its speed reducer and drive shaft. Guides 75, 76 above and below the chain (FIG. 8) provide rigidity. Movement of the chain occurs smoothly at a timed rate notwithstanding the loading forces to which the chain is subjected.

Figure 5:
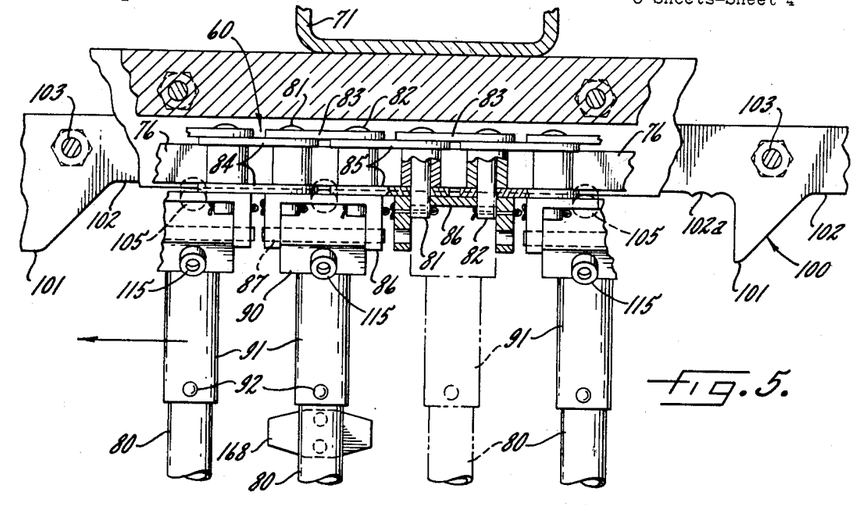
FIG. 5 is an enlarged fragmentary section taken along the line 5—5 of FIG. 3 looking down upon the arms mounted on the conveyer chain.

Mounted upon the successive links of the chain are carrier arms which are utilized to support the individual print holders. Since the chain links and carrier arms are of uniform construction, one of the arms, indicated at 80, may be selected for detailed description, with particular reference to FIGS. 3, 5 and 8. The arm 80 is supported by a pair of chain pins 81, 82. The latter have a link 83 between them and engage adjacent links 84, 85. Opposite the link 83 is a chain bracket 86 which is of U or clevis shape, being spanned by a hinge pin 87. Mounted on the pin 87 for upward and downward swinging movement is an arm support 90. In accordance with the invention means are provided for readily engaging and disengaging each arm 80 with respect to one of the supports 90, enabling arms to be inserted into the supports in any number required. Thus each support is provided with an integral socket 91 into which the inner end of an arm 80 may be inserted. The arm is securely held in position by detent buttons 92 which are affixed to the ends of a C-shaped spring 93, the buttons registering in alined openings formed in the arm and socket respectively. The arms may be just as readily withdrawn at the time of unloading when the process cycle has been completed.

For the purpose of rocking the arm 80 upwardly and for permitting it to drop downwardly under force of gravity, a cam 100 is provided having a succession of hills 101 and valleys 102. The cam bar is stationarily clamped in place by suitable clamping screws 103 (see FIG. 8). For riding upon and following the contour of the cam bar, a cam follower 105 is provided on the arm support, the cam follower being in the form of a roller freely rotatable about a mounting screw 106. While gravity may be relied upon for lowering of the arm, an upper cam bar 110 of complementary shape may be used having hills 111 and valleys 112 and secured in place by clamping screws 113, with the edge of the cam bar being engaged by a roller 115 freely rotatable on a mounting screw 116. The cam follower roller 115, as will appear, serves the additional purpose of holding the arm 80 in its upraised position during the initial portion of the return run of the chain when the arm is inverted. The cam bars 100, 110 may be provided in sections with the hills and valleys thereon programmed to cause lowering and raising of each arm as it passes for submersion and removal of the print into and out of the successive vats.

Figure 4:
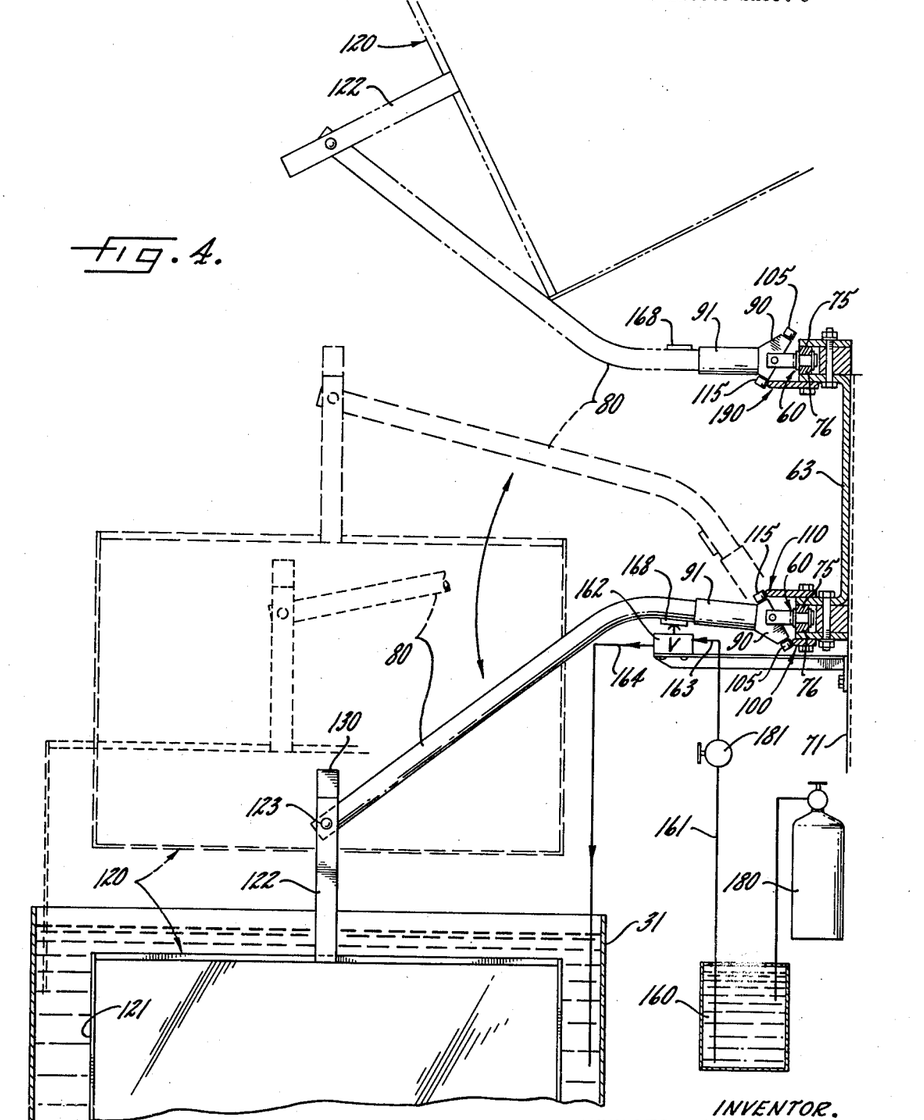
FIG. 4 is an enlarged portion of FIG. 3 showing various positions of a carrier arm and print holder.

In accordance with one of the aspects of the present invention print holders are provided which are horizontally pivoted to the respective arms so as to be normally pendulous thereon but which are cocked into different angled positions upon removal from the successive vats thereby to change the direction of drip along the faces of the prints to avoid a drain pattern on the finished product. In the present embodiment the print holder 120 (see FIG. 4) is in the form of a plane defined by an open frame 121 having a hanger 122 which is connected by a pin 123 to the end of an associated arm 80. Means (not shown) are provided for securing the film or print in the holder and for permitting rapid mounting and unmounting. It will be apparent that the area available in the holder may be used for a single large print or for two or more smaller prints arranged in a plane side-by-side.

Figures 10, 11:
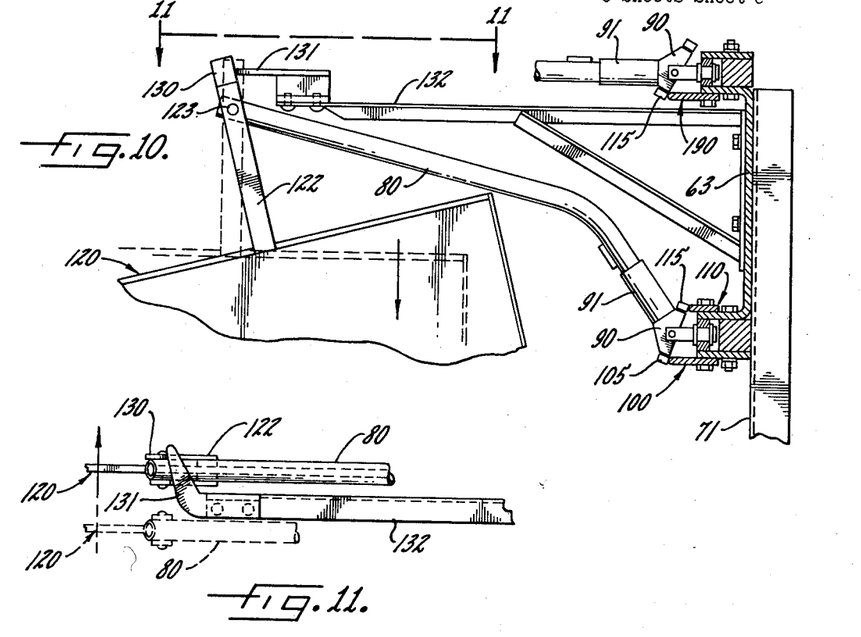
FIG. 10 is a fragmentary vertical section showing one of the carrier arms and means for cocking the print holder thereon.
FIG. 11 is a fragmentary section looking along the line 11—11 in FIG. 10.
Figure 12:
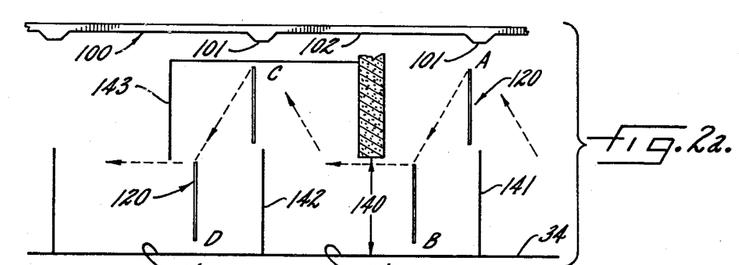
FIG. 12 is a view similar to FIG. 10 but showing means for cocking in the opposite direction.
Figures 12, 13:
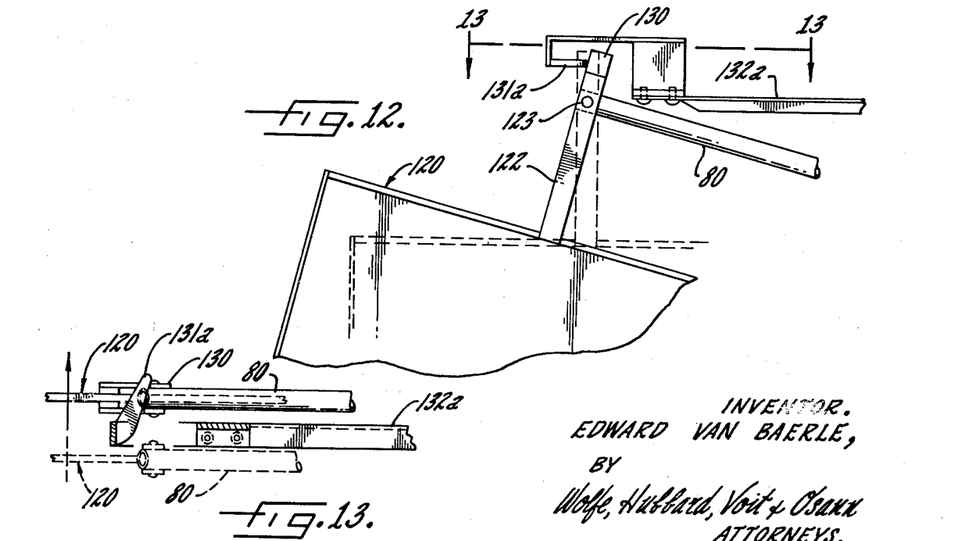
FIG. 13 is a fragmentary section looking along the line 13—13 in FIG. 12.

For the purpose of camming the print holder to the right, as viewed in FIG. 10, and looking along the direction of movement, the hanger 122 is provided with an upward extension 130 which serves as a cam follower, engaging a cam 131 which is arranged in the path of movement. The cam is secured to a bracket 132 which is stationarily mounted on the frame of the machine. It will be apparent from FIG. 11 that as the arm moves past the cam, from dotted position to full position, the upper end 130 of the hanger 132, engaging the edge of the cam, will be cammed to the left, thus causing the print holder to swing to the right as shown, causing the solution dripping from the print, along the direction of the arrow, to be at an angle to the print edges. The cam 131 is so positioned and of such length that the print holder is maintained in angled position during the time that active dripping takes place and as the print is moved toward the succeeding vat. Means are provided above a succeeding vat for cocking the print holder in the opposite direction, i.e., to the left. For this purpose a cam is employed which engages the cam follower 130 along its opposite edge as shown in FIGS. 12 and 13. In this figure corresponding parts are indicated by corresponding reference numerals with the addition of subscript $a$. It will be apparent that by modifying the throw of the cam for successive vats, the print holder may be caused to occupy a wide range of angular positions during the time that dripping takes place so that there will be no evidence on the print, by reason of streaking or the like, of the direction of drip.

Figures 6, 6A, 7:
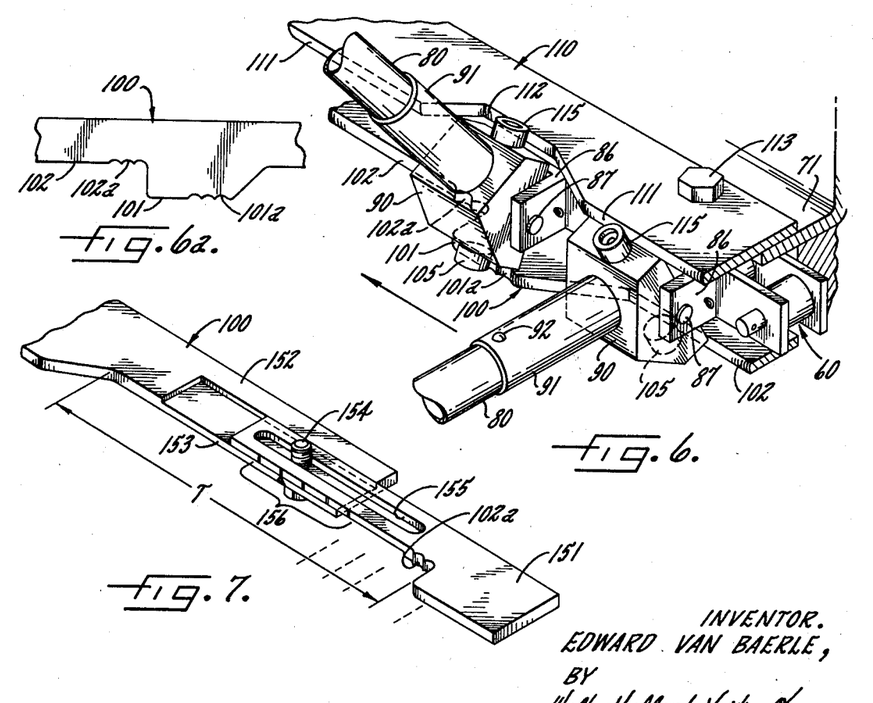
FIG. 6 is a partial perspective of the cam bars which control the vertical movements of the carrier arms.
FIG. 6a shows the profile of a section of the cam bar.
FIG. 7 is a partial perspective showing the portion of the cam track which allows for variation in development time.

In accordance with another aspect of the present invention means are provided for vertically jogging the carrier arm to speed up the dripping when the arm is elevated and for clearing the print of air bubbles when the arm is in lowered position. This is accomplished by serrating the initial portions of the hills and valleys on the cam bar 100 to provide a scalloped or saw-toothed edge as indicated at 101a, 102a in FIG. 6a.

It is one of the important features of the present invention that the beginning and end portions of the endless loop of drive chain are separated by a lightproof wall or barrier so that loading and development may be accomplished in darkness, with means for permitting traversing of the carrier arms and print holders through the opening in the wall without penetration of the light. This is accomplished by providing barriers or baffles opposite the opening in the path of the light, and providing means for oscillating the carrier arms so that each print holder is moved into light-obstructed position during the time that the print holder is traversing the wall but restored to its original position after passing through the wall.

Figure 2:
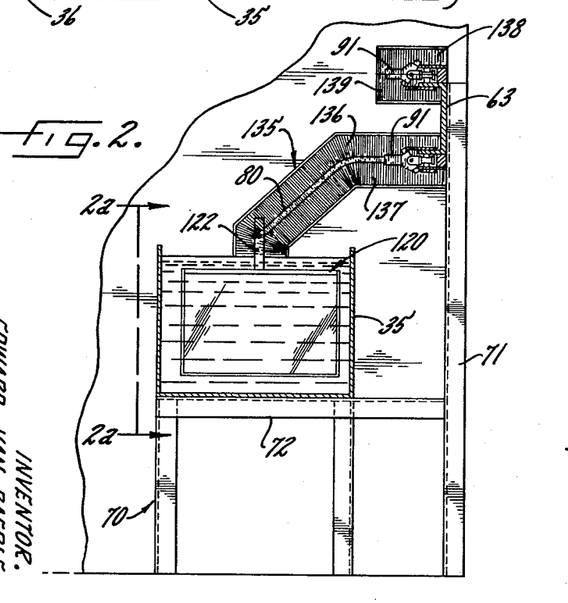
FIG. 2 is an end elevation taken along the line 2—2 of FIG. 1a from the darkroom side and looking toward the light restrictive brushes and baffles.

To prevent light leakage in the area traversed by the carrier arms, a light lock is provided in the form of overlapping flexible opaque members which are brushed aside successively by the arm as it proceeds, which light obstructing members are preferably in the form of flexible bristles arranged in inwardly extending, slightly overlapping relation. As shown in FIG. 2, the bristles, which shield the wall opening 135, are mounted in the form of two, opposed brushes 136, 137. A similar set of brushes 138, 139 shields against passage of light above the upper run of chain. To shield the opening 140 through which the print holder must travel, the barriers between adjacent vats are utilized as light baffles. Thus, referring to FIGS. 1a, 2 and 2a, the barrier 141, between vats 34 and 35, serves as a first baffle with the print holder 120 being moved from its raised position indicated at A angularly downward past the barrier 141 to the light-obstructed position B. As the print holder continues to move, the arm on which it is supported is cammed upwardly so that the print clears a second barrier 142 between the vats 35 and 36, returning to its upraised position indicated at C. The vat 35 and the adjacent portion of the wall may be painted a dark color to reduce the bounce of light through the vat. The vat 35 is, as stated, filled with water so that it is utilized for print-washing purposes in addition to its function as a light lock. The print holder is subsequently lowered to position D.

In order to further insure against entry of light a baffle 143 is provided which shields the print holder 120 when it is in its upraised position C immediately after it has traversed the wall opening. The chamber defined by the baffle 143 and the wall may also be painted with a light-absorbing pigment. The contour of the cam bar 100, as it appears in plan view, required to produce the print holder motion through the wall opening is set forth at the top of the diagram of FIG. 2a. It will be apparent that an auxiliary baffle 143 may be employed on the right hand side of the wall, in mirror image, as still further assurance against entry of unwanted light.

In accordance with one of the more detailed features of the invention the section of the cam bar 100 which corresponds to the developer vat 31 is made of relatively slidable sections so that the length of the cam valley, and hence the amount of time which the print spends in the developer vat may be varied. Thus, referring to FIG. 7, the cam bar 100 is made of two sections 151, 152, overlapping along the valley 153 and capable of being clamped in their adjusted position by a clamping screw 154 engaging a slot 155. The length of the valley, in terms of time T, can thus be varied over a substantial range. In this way it is possible to compensate for either under or over exposure of the print. The sections of cam bar may be calibrated as indicated at 156 and the operator of the machine may be instructed as to the setting to use for a particular piece of work.

Figures 8, 9:
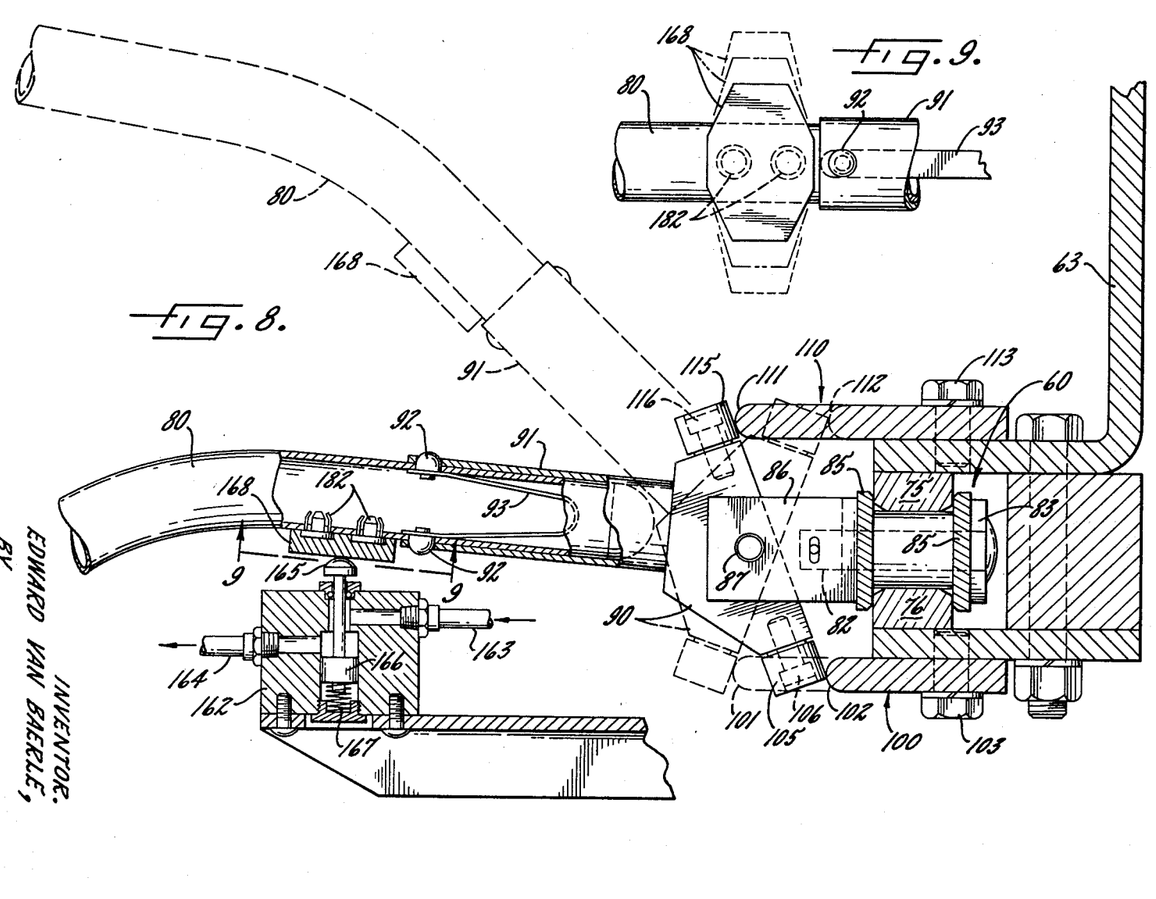
FIG. 8 is an enlarged section of FIG. 4 showing the carrier arm mounting means and the valving arrangement for the automatic replenishing system.
FIG. 9 is a sectional view taken along the line 9—9 of FIG. 8 and showing the replaceable cam.

In carrying out the invention means are provided for automatically replenishing the solutions in the various vats in accordance with the number of prints which are treated. Thus referring to FIG. 4 and assuming, by way of example, that the vat shown in the developer vat 31, an auxiliary supply of developer liquid 160 is provided feeding a supply line 161 which leads to the vat, with an interposed replenishing valve 162 which is cycled by the passage of one of the carrier arms 80. Referring to FIG. 8, the replenishing valve 162 has an inlet 163, an outlet 164 and a valve plunger 165 including piston 166, the latter being normally biased into its upper position by a spring 167. The plunger 165 is arranged in the path of movement of an actuating cam 168 secured to the underside of a carrier arm 80. Thus as the arm 80 sweeps by, the cam 168 on the arm causes cycling of the valve for passage of a small quantity of the replenishing liquid to the vat. Pressure to induce the flow may be obtained by enclosing the supply 160 and providing an external source of regulated gas pressure 180. A throttling control orifice 181 in the line 161 adjusts the flow which takes place per unit time that the valve is open. If desired, the length of time that the valve is open may be predetermined by modifying the cam 168, particularly the length thereof, as shown in FIG. 9. To permit convenient replacement of the cam 168 by one of different length, the cam may be fitted with snap fasteners 182 which fit into mating apertures on the underside of the arm 80.

It is a feature of the present arrangement that replenishing liquid is added in accordance with the area of print being treated, the valve 162 being actuated once for each arm carrying a loaded print holder. Each of the vats may be provided with a replenishing system of the type described. As a result the processing machine may be run steadily for many hours without any change in the final product and without requiring any manual replenishment or other maintenance.

It is one of the features of the present device that means are provided for guiding the returning print holders along the upper path of the loop of chain in elevated position for drying prior to unloading of the holders at an unloading station. For this purpose an auxiliary stationary cam bar, or retaining bar, 190 is provided along the upper run of chain for engaging the cam follower 115 on the arm socket assembly as shown in FIG. 3. As each of the arms 80 rounds the drive sprocket it is supported in the position shown and the holder 120 which is secured to it drops into an angled position with the corner of the holder resting upon the supporting arm. With the holders in this position, means are provided for blowing heated air between them. This is accomplished by a blower 191 driven by a motor 182 with a heater 193 in the path of movement of the air which exists in the direction of the arrows shown in FIG. 3. With each of the print holders oriented as shown, it is a simple matter to slip the arms from their sockets as they traverse the unloading station and to remove the films or prints from the holders.

While the overall operation will be apparent from the foregoing description, it may be reviewed briefly as follows: At the loading station an exposed but unprocessed film or print is slipped into position in a holder and the arm 80 is pressed into an approaching one of the sockets 90. If necessary, the adjustable cam bar corresponding to the developer vat is adjusted in accordance with instructions to provide the desired developing time. As the valley 153 of the developer cam bar is reached, the arm is rocked downwardly into its lowered position submerging the print holder in the vat. Jiggling occurs automatically to dislodge air bubbles. As the arm approaches the end of the developer vat it is cammed upwardly to clear the barrier and then allowed to drop downwardly so that the print is submerged in the rinse vat. After this operation is repeated for each of the vats in the darkroom, the print holder follows a zigzag path, being lowered between the barrier 141 which serves as a light baffle and the wall and then raised to clear the barrier 142. As the carrier arm 80 traverses the opening, or slot, in the wall it sweeps its way through the interlocking bristles without admission of light to the darkroom. On the opposite side of the wall the print holder clears the final baffle 143 and is successively submerged and withdrawn from the vats in the lightroom, the number and content of the vats depending upon the particular color developing process.

At the end of the loop of chain each print holder is swung into inverted position, supported for passage through the dryer 50. Upon exiting from the dryer all of the arms 80 are removed at the unloading station.

The machine described above is particularly well suited for prompt custom processing. The machine is kept running during the course of the working day and when exposed films are received, or exposed prints at hand, they are immediately slipped into print holders with the arms thereof inserted into the sockets approaching the loading station. Since there is no need to wait until a sizeable batch has been accumulated, and since the machine operates efficiently regardless of the number of arms in use, the work may be processed and returned to the customer in the shortest possible time. With the machine running constantly for normal custom work, a single, relatively unskilled operator suffices to handle both the loading and unloading stations. Alternatively in a high production set-up, where there is a constant backlog of incoming work, the machine may be kept fully loaded at all times to produce an output, in units per hour, which is greater than that which can be achieved with conventional procedures.

While the developing solutions and cam bar program may be readily changed to adapt the machine to various color processes, where an alternate process is necessary this may be more conveniently provided in a separate machine.

I claim as my invention:

1. In a processing machine for photographic films and prints the combination comprising an endless loop of drive chain extending longitudinally and having means for driving at a constant speed, a row of vats adjacent the drive chain and extending parallel thereto, said chain having a series of carrier arm supports closely spaced thereon and hinged for individual vertical swinging movement, carrier arms for mounting on the supports, means interposed between the carrier arms and supports permitting easy engagement and disengagement, print holders suspended at the ends of the respective carrier arms, means including a cam bar extending parallel to the chain and cam followers on the carrier arm supports for camming the carrier arms upwardly and downwardly so that when an arm is engaged with a support the print holder thereon is submerged in the successive vats for predetermined different time intervals upon advancement of the chain in accordance with the contour of the cam bar, said loop of chain having a loading station near one end for loading the arms on the supports and having an unloading station near the other for removal of the arms from the supports after transversal of the print holder through said row of vats.

2. The combination as claimed in claim 1 in which the loop of chain includes a lower run and an upper run having respective stationary cam bars and in which each carrier arm on the machine has an associated first cam follower for cooperating with the lower stationary cam bar as the carrier arm tranverses the lower run and a second cam follower for cooperating with the upper stationary cam bar as the carrier arm traverses the upper run of chain so that the carrier arms traversing the upper run are held in upraised position for removal of the carrier arms from the respective supports.

3. The combination as claimed in claim 1 in which a vat has a supply of replenishing liquid and in which means are provided for transferring a metered amount of liquid from the supply to the vat incident to each passage of one of the carrier arms.

4. The combination as claimed in claim 1 in which a vat has a supply of replenishing liquid means including a line interconnecting the supply and the vate having an interposed metering valve arranged in the path of movement of the carrier arms, and means defining an actuating cam secured to each of the arms for cycling the metering valve as the arm traverses the valve position.

5. The combination as claimed in claim 1 in which at least one of the vats has a supply of replenishing liquid, means including a line interconnecting the supply and the vat having an interposed metering valve for metering the liquid, the valve having a valve operator in the path of movement of the arms, a cam on each of the arms for cycling the valve operator upon passage of an arm, the cam being readily removable from the arm for replacement by a cam of different configuration for varying the metered amount of liquid which is transferred to the vat upon passage of the arm, thereby permitting the degree of replenishment to be varied in accordance with the area of the prints in the print holder.

6. The combination as claimed in claim 1 in which the initial vat contains developer liquid and in which the cam bar adjacent the initial vat is adjustable to change its effective length thereby to vary the amount of time that the print is submerged in the vat.

7. The combination as claimed in claim 1 in which the first vat contains developed liquid and in which the cam bar adjacent the first vat is formed of relatively slidable overlapping portions calibrated to vary the effective length of the lowering portion thereof for predetermining the amount of time that the prints on the carrier arms are submerged in the developer liquid.

8. The combination as claimed in claim 1 in which the loop of chain has a lower run and an upper run with means for maintaining the carrier arms in upraised position as they traverse the upper run, a dryer housing surrounding the carrier arms and holders as the latter are supported in position along the upper run, and means including a blower and heater for directing heated air along the print holders in the upper run for drying the print surfaces prior to passage thereof to the unloading station.

9. The combination as claimed in claim 1 in which each print holder has a hanger pivoted to the outer end of the associated carrier arm terminating in a projection and in which stationary cams are provided in the path of such projection for camming the projection laterally thereby to cock the print holder from a normal position to vary the angle of the drainage path on the face of the print as it drains prior to lowering into a successive vat.

10. The combination as claimed in claim 1 in which each print holder has a hanger, a free pivot at the end of the associated carrier arm for supporting the holder in pendulous position, a first stationary cam at one of the vats in the path of the hanger engageable during drainage for camming the hanger laterally in one direction from its pendulous position, and a secondary stationary cam at a succeeding vat in the path of movement of the hanger and engageable during drainage for camming the hanger laterally in the opposite direction from its pendulous position thereby to vary the angle of the drainage path on the face of the print.

11. The combination as claimed in claim 1 in which the cam bar has hills and valleys and in which the initial portion of at least some of the hills and valleys is serrated to produce jiggling of the print holder.

12. In a processing machine for photographic films and prints, the combination comprising an endless longitudinally extending loop of drive chain having means for driving at a constant speed, a row of vats adjacent the drive chain and extending parallel thereto, a series of carrier arms extending outwardly from the drive chain and hinged for individual vertical swinging movement, print holders at the end of the respective carrier arms suspended over the vats, means including a cam bar extending parallel to the chain and cam followers coupled to the carrier arms for camming the carrier arms upwardly and downwardly so that the prints are submerged in the successive vats for predetermined time intervals upon advancement of the chain, means defining loading and unloading stations near the respective ends of the loop of chain, a wall defining a darkroom containing the loading station and a lightroom containing the unloading station, said wall having an opening for passing the loop of chain as well as the arms and print holders thereon, means including a stationary baffle opposite the opening for preventing direct passage of light therethrough, said cam bar means being so formed as to pass the print holder along an angular path between the baffle and the opening for passage through the opening.

13. The combination as claimed in claim 12 in which the portion of the opening traversed by the arm is lined with overlapping flexible opaque members which are displaced progressively upon movement of the arm for cutting off passage of light adjacent the arm as the arm moves through the opening.

14. The combination as claimed in claim 12 in which the portion of the opening traversed by the carrier arms is lined with oppositely facing brushes having overlapping bristles for cutting off passage of light adjacent each arm as it moves through the opening.

15. The combination as claimed in claim 12 in which a plurality of baffles are provided at least one on each side of the opening defining a zigzag path for the print holders to prevent direct passage of light from the lightroom to the darkroom and in which the cam bar is formed to cause the print holders to follow the zigzag path as they traverse the opening in the wall.

16. In a processing machine for photographic films and prints, the combination comprising an endless loop of drive chain extending longitudinally and having means for driving at a constant speed, a row of vats adjacent the drive chain and extending parallel thereto, said chain having a series of carrier arm supports closely spaced thereon and hinged for individual vertical swinging movement, carrier arms mounted on the supports, print holders suspended at the ends of the respective carrier arms, means including cam surfaces adjacent the chain for camming the carrier arms upwardly and downwardly timed with the movement of the chain so that the print holders thereon are successively submerged in the successive vats for predetermined different time intervals upon advancement of the chain, said loop of chain having a loading station near one end for loading the carrier arms and having an unloading station for unloading the arms following traversal of the row of vats, said print holders being horizontally pivoted to the ends of the respective arms and means including fixed cams arranged in the path of movement of the print holders for engaging successive ones of the print holders for maintaining each print holder cocked at an angle during drainage of the print, the cams being so constructed and arranged as to produce unlike degrees of cocking following removal of the print holders from different ones of the vats.

References Cited

UNITED STATES PATENTS

| | | | |
|---|---|---|---|
| 2,004,410 | 6/1935 | Houch | 95—89 |
| 2,545,031 | 3/1951 | Izzi. | |
| 3,183,818 | 5/1965 | Pangborn. | |
| 3,196,772 | 7/1965 | Sickles. | |
| 3,203,336 | 8/1965 | Limberger | 95—89 |
| 3,314,352 | 4/1967 | Grant | 95—91 |

NORTON ANSHER, Primary Examiner

LEO H. McCORMICK, Jr., Assistant Examiner

U.S. Cl. X.R.

95—94; 96—48